US006915238B2

United States Patent
Watts et al.

(12) United States Patent
(10) Patent No.: US 6,915,238 B2
(45) Date of Patent: Jul. 5, 2005

(54) SYSTEM AND METHOD FOR PROVIDING AUTOMATICALLY PROCESSED, NETWORK-ACCESSIBLE TELEMETRY DATA

(75) Inventors: Jeffrey Thomas Watts, Vernon, NJ (US); John Phillip Schrumm, Doyleston, PA (US); Thomas G. Nowak, Langhorne, PA (US); Ganesh Subramaniam, Monmouth Jct., NJ (US)

(73) Assignee: SES Americom, Inc., Princeton, NJ (US)

( * ) Notice: Subject to any disclaimer, the term of this patent is extended or adjusted under 35 U.S.C. 154(b) by 208 days.

(21) Appl. No.: 10/023,892

(22) Filed: Dec. 21, 2001

(65) Prior Publication Data

US 2002/0095270 A1 Jul. 18, 2002

Related U.S. Application Data

(60) Provisional application No. 60/258,501, filed on Dec. 29, 2000.

(51) Int. Cl.$^7$ .............................. G06F 11/00; G06F 15/00
(52) U.S. Cl. ................................................... 702/188
(58) Field of Search ........................... 702/188; 700/28; 455/430–431, 427, 13.1, 12.1, 3.2; 348/144; 128/899; 342/357.09

(56) References Cited

U.S. PATENT DOCUMENTS

| | | | | |
|---|---|---|---|---|
| 5,594,454 A | * | 1/1997 | Devereux et al. | ....... 342/357.09 |
| 5,878,345 A | * | 3/1999 | Ray et al. | .................... 455/431 |
| 5,878,346 A | * | 3/1999 | Ray et al. | .................... 455/431 |
| 5,940,739 A | * | 8/1999 | Conrad et al. | ............. 455/13.1 |
| 6,076,094 A | * | 6/2000 | Cohen et al. | ............ 707/104.1 |
| 6,108,539 A | * | 8/2000 | Ray et al. | .................. 455/430 |
| 6,144,859 A | * | 11/2000 | LaDue | ........................ 455/511 |
| 6,362,772 B1 | | 3/2002 | Skotch et al. | .................. 342/42 |
| 6,597,892 B1 | * | 7/2003 | Caldwell et al. | ........... 455/12.1 |
| 2002/0023654 A1 | * | 2/2002 | Webb | ......................... 128/899 |
| 2002/0041328 A1 | * | 4/2002 | LeCompte et al. | ......... 348/144 |
| 2003/0032426 A1 | * | 2/2003 | Gilbert et al. | ............. 455/427 |
| 2003/0083756 A1 | * | 5/2003 | Hsiung et al. | ................ 700/28 |

FOREIGN PATENT DOCUMENTS

| | | | | |
|---|---|---|---|---|
| JP | 405183352 A | * | 7/1993 | ................ 327/334 |
| JP | 02003124865 A | * | 4/2003 | ............ H04B/7/26 |

OTHER PUBLICATIONS

Business Wire "Loral Skynet Granted Its First–ever Patent for Innovative Transponder Performance Measurement System" Jul. 25, 2002 (1 page).

* cited by examiner

*Primary Examiner*—John Barlow
*Assistant Examiner*—Aditya S. Bhat
(74) *Attorney, Agent, or Firm*—Fleshner & Kim, LLP

(57) ABSTRACT

A method for monitoring the operation of a spacecraft make telemetry data directly accessible to customers of a satellite services provider over a network. The method may be completely automated at least from the perspective of the provider so that the need for human intervention during telemetry data retrieval and processing is eliminated. This, in turn, will substantially reduce the delays, costs, and inefficiencies associated with conventional telemetry data processing and customer service methods. In one application of the method, helix current data is automatically retrieved, processed, and made accessible at a service provider's website for retrieval by customers. The website may be password-protected for security purposes. If desired, telemetry data may be provided on the website on a real-time or near real-time basis. The method may advantageously be integrated into a customer service management model for a satellite service provider in order to streamline efficiency and reduce costs.

17 Claims, 12 Drawing Sheets

SYSTEM AND METHOD FOR PROVIDING AUTOMATICALLY PROCESSED, NETWORK-ACCESSIBLE TELEMETRY DATA

REFERENCE TO RELATED APPLICATIONS

This application claims the benefit of provisional U.S. patent application Ser. No. 60/258,501, filed on Dec. 29, 2000.

BACKGROUND OF THE INVENTION

1. Field of the Invention

This invention generally relates to information processing systems, and more particularly to a system and method for providing network-accessible telemetry data which has been automatically retrieved from storage and processed for viewing, for example, by customers and/or employees of a satellite service provider.

2. Description of the Related Art

The communications industry has grown substantially over the past few decades. As a result, consumers have access to services that were never available before. In fact, entire industries have been created or greatly influenced by satellite communications, not the least of which include the commercial telecommunications and television industries.

In order to provide these services, companies usually enter into agreements with satellite providers regarding the use of one or more of transponders. In order for successful communication to take place through these transponders, the transmitting antennas, which are usually maintained by the customer, must be properly aligned with the satellite. Otherwise, degradation in service quality may occur. Misalignment is not the only anomaly that may arise during satellite communications. Modem satellites typically monitor 3,000 individual data points multiple times per second. As those in the industry are aware, a disruption in any one or more of these points could negatively influence communication performance.

FIG. 1 shows the steps typically included in a conventional method which satellite service providers use for managing customer service calls. The method begins with a customer calling a Technical Operations Center (TOC) of the satellite service provider to report a problem relating to communications quality that has occurred. (Block 1). In response to the call, a TOC operator will open a trouble ticket for the customer, even though the service window may no longer be active and therefore the problem does not currently exist. (Block 2). The TOC operator will then notify an earth station manager or analyst of the ticket, usually by phone or e-mail. (Block 3). The earth station analyst researches the problem using mostly manual techniques.

Depending upon availability, the analyst will obtain telemetry data for the customer's satellite transponder for the period of time the trouble was reported. (Block 4). Some satellite service providers have access to a tool known as the Handing Enhancement for Archiving and Retrieving Telemetry (HEART) storage system. This tool was created by GE Americom for its satellite communications department. The HEART system is a robotic CD-ROM storage device (similar to a jukebox) which stores huge amounts of Telemetry, Tracking, and Control (TT&C) data and which retrieves that data upon request under the control of a computer. In handling a trouble ticket, the earth station analyst may use a software tool called OPNHEART to respond to the customer inquiry for telemetry data from the HEART system over the relevant time period.

The telemetry data obtained by the HEART system is analyzed by the earth station analyst to create a plot of telemetry data which should confirm that a problem in fact existed (Block 5). Typically, the analyst must perform approximately thirty steps to generate this plot. The plot may then be sent to the customer or the customer may otherwise be notified of the results.

If, for example, the problem relates to a mis-alignment in the transmitting antenna, the customer may be advised to correct this mis-alignment. Once corrective action is taken, the customer may contact the TOC to inform them of the correction. (Block 6). The earth station manager may then generate a second plot of telemetry data to confirm that correction has taken place. (Block 7). Finally, the customer is notified of this confirmation and the trouble ticket is closed. (Block 8).

Conventional customer service management methods require significant human intervention, are subject to error, and are generally too slow to meet customer needs. For example, in a typical management scenario it has been determined that it takes approximately ten minutes for a TOC operator to open a trouble ticket, another ten minutes for the TOC operator to contact the earth station analyst to notify him of the problem, anywhere from thirty minutes to three hours for the earth station analyst to analyze the telemetry data and generate a plot which can be sent to the customer, and at least another ten minutes to notify the customer of the plot or the results of the analysis. These delays may be increased if the customer calls after business hours or if there are excessive numbers of trouble tickets to be processed. Taken in combination, these delays may add up to a response time by the service provider of several days or more.

All of the drawbacks of the conventional management methods introduce inefficiencies into the business of the customer and the satellite service provider. Further, the substantial human involvement that it is required increases the overhead costs of the satellite provider in terms of personnel and physical plant costs.

In view of the foregoing considerations, it is clear that there is a substantial need for an improved system and method for managing customer service calls by the satellite service provider, and moreover one which does so faster, more efficiently, and without any human intervention whatsoever.

SUMMARY OF THE INVENTION

The present invention is an automated system and method for monitoring the operation of a spacecraft, which system and method may advantageously be integrated into a customer service management model for a satellite service provider. Preferably, the system and method is completely automated at least from the perspective of the provider so that the need for human intervention during data retrieval and processing is eliminated. This, in turn, will substantially reduce the delays, costs, and inefficiencies associated with conventional telemetry data processing and customer service methods.

The invention is predicated on making telemetry data directly accessible to the customers of the satellite service provider, in order to reduce, for example, the personnel resources required at a technical operations center and earth ground station, at least for customer service purposes. In accordance with one embodiment, the method of the present invention includes retrieving telemetry data from a storage device, processing the telemetry data, and making the processed telemetry data accessible on a network. Preferably, at least the processing and making steps are automatically performed in response to a request received from a customer or technician. This request may be received electronically in the form of an e-mail or through selections made in an interactive website. The latter is preferable because the method may then be performed in a way that is completely transparent to the satellite service provider. For security purposes, the website may be secured by password entry or some other protective measure. From a business method perspective, an accounting record may be automatically generated when a customer requests telemetry data from the website.

While telemetry data may be provided through the network at the customer's request, a variation of the invention contemplates making processed telemetry data available on a periodic basis without initiation from the customer. This may be accomplished, for example, by programming a computer at the satellite service provider's site that will automatically retrieve, compute, and then post desired telemetry data on the website at, for example, the end of every month so that the customer may perform quality review checks. As with previous embodiments, this variation may be automatically performed without any intervention by satellite provider personnel.

A second embodiment of the method of the present invention specifically applies the first embodiment of the method to providing helix current data to satellite customers. Helix current data has been determined to be important in determining the existence and cause of anomalies in satellite systems. In accordance with the second embodiment, helix current data is retrieved from a storage device such as the HEART system and processed into a graph over a predetermined period of time, which, for example, may be 72 hours. By entering data at the interactive website, the customer can change the time period and/or make other designations that will cause they data to be output in a customized form. In another embodiment, telemetry data is made available on the website on a real-time or near real-time basis.

The invention therefore overcomes many of the drawbacks of conventional methods. By automating the process and making telemetry data directly accessible to customers over a network, the invention provides satellite customers with immediate access to data that would take hours or even days to obtain using conventional methods. This rapid response of processed data will enable customers to pinpoint anomalies with greater accuracy and reliability, which can only improve the customer's reputation for service in the industry. The rapid response will also streamline efficiency from both the customer's and satellite provider's perspective in a way that will result in substantial cost-savings to all parties involved.

DESCRIPTION OF THE PREFERRED EMBODIMENTS

The present invention is a system and method for making various forms of data relating to the operation of a spacecraft accessible on a network, which method may then be incorporated into a customer service model of a service provider. The spacecraft may be any type of space-borne object including geosynchronous and non-geosynchronous satellites, space stations, probes, space shuttles and planes, or any other object whose operational status is of interest to personnel on the ground. The personnel may include, for example, a customer of a satellite service provider or a technician. The invention is particularly well suited to providing information relating to a disruption or degradation in satellite service. Under these conditions, the invention will make relevant performance data accessible to users on the ground vis-a-vis the network.

While this troubleshooting application is one desirable application of the invention, the invention is not intended to be restricted in this manner. Rather, the invention may advantageously be used to make virtually any type of telemetered data network-accessible. For example, in a space station application the medical condition of one or more astronauts may be monitored with the invention. Other data which may be provided by the invention relate to the status of life support, communications, mechanical, and propulsion systems, as well as any other on-board system whose operational status may be of interest to personnel on the ground. The present invention is also a business method which provides telemetered information in either raw or processed form to users over, for example, an internet website, preferably for a fee. These and other features of the invention will be described in greater detail in the discussion which follows.

Figure 1:
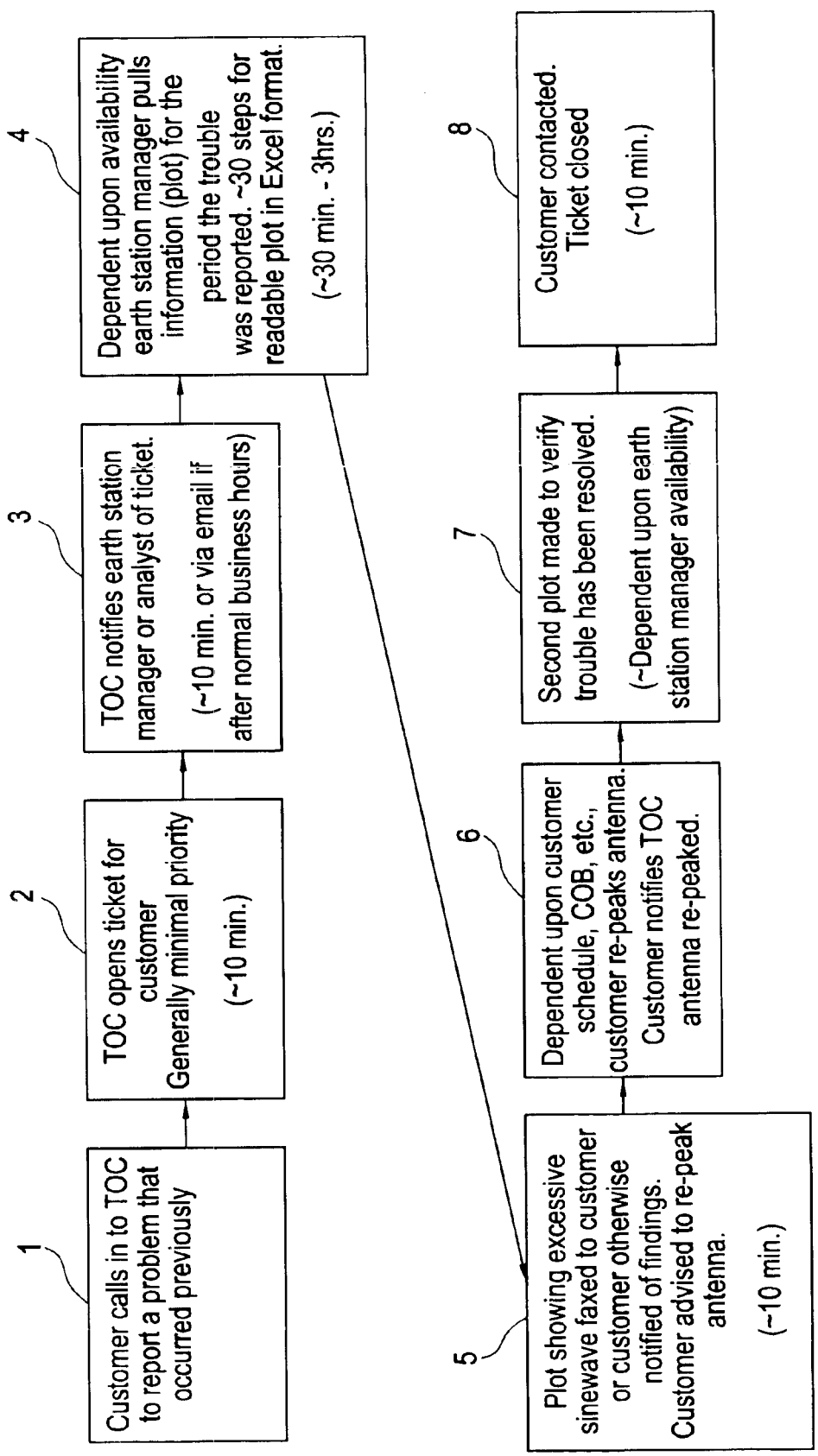
FIG. 1 is a flow diagram showing steps included in conventional method which satellite service providers have used for managing customer service calls.
Figure 2:
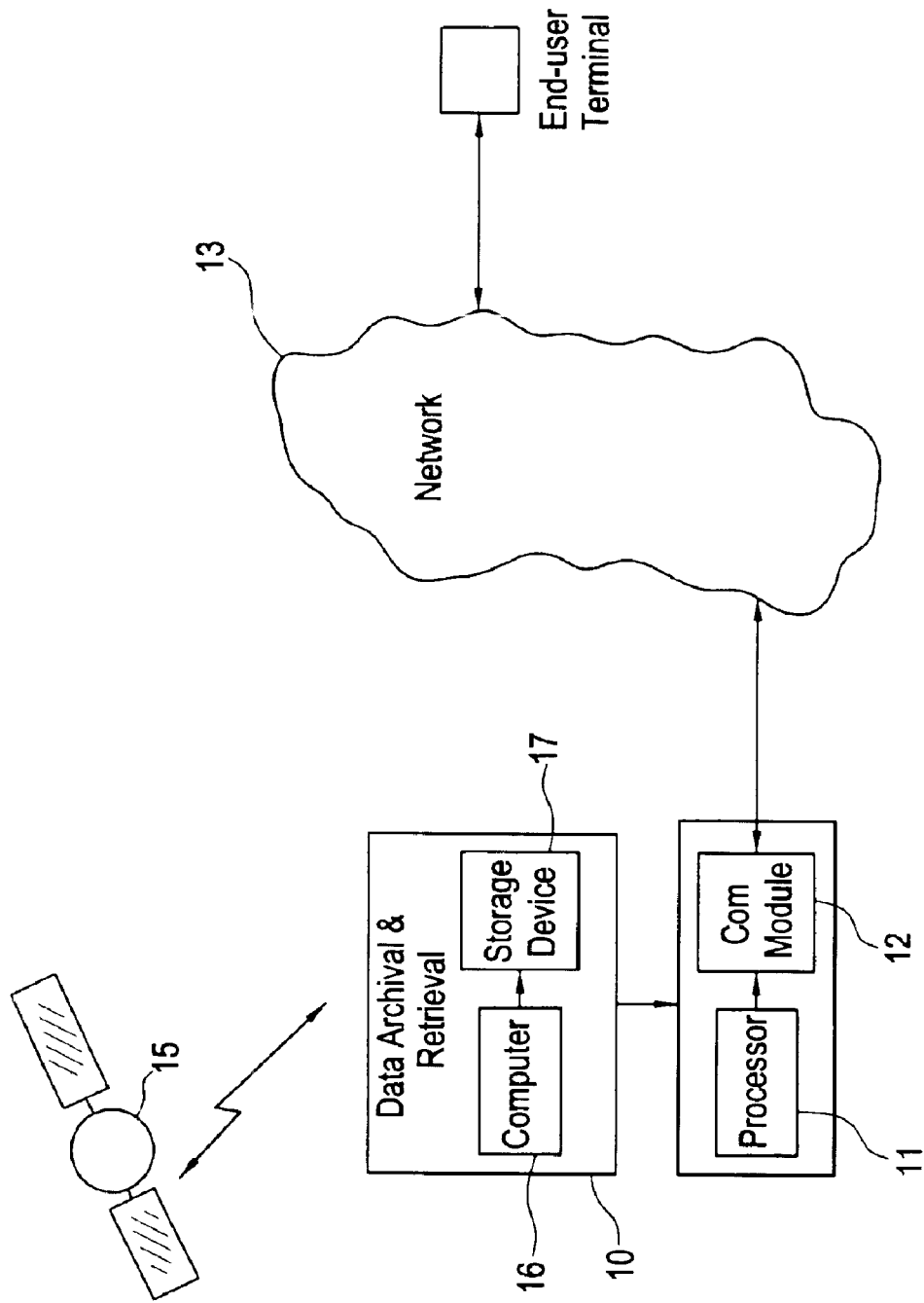
FIG. 2 is a diagram showing a first embodiment of a system for monitoring spacecraft operation in accordance with the present invention.

Referring to FIG. 2, a first embodiment of the system of the present invention monitors the operational performance of a spacecraft, which for convenience purposes will hereinafter be referred to as a satellite. The system includes a storage device 10, a processor unit 11, and a communications module 12 for connecting to a network 13. The network may be the World Wide Web accessible through the internet, a virtual private network, or any other type of network known.

The processor unit may be a personal computer controlled by a standard operating system such as Microsoft Windows, a workstation running UNIX, a main-frame computer, or any other type of processing system. A particular example of the processor unit of the invention will be described in connection with the second embodiment; however, the invention is not intended to be limited by this disclosure.

The storage device may be any device capable of storing telemetry data derived from the satellite, which is illustratively shown by reference numeral 15. Preferably, the storage device is the HEART system, which includes an internal computer 16 and a robotic CD-ROM storage device 17 for archiving the data telemetered from the satellite.

Figure 3:
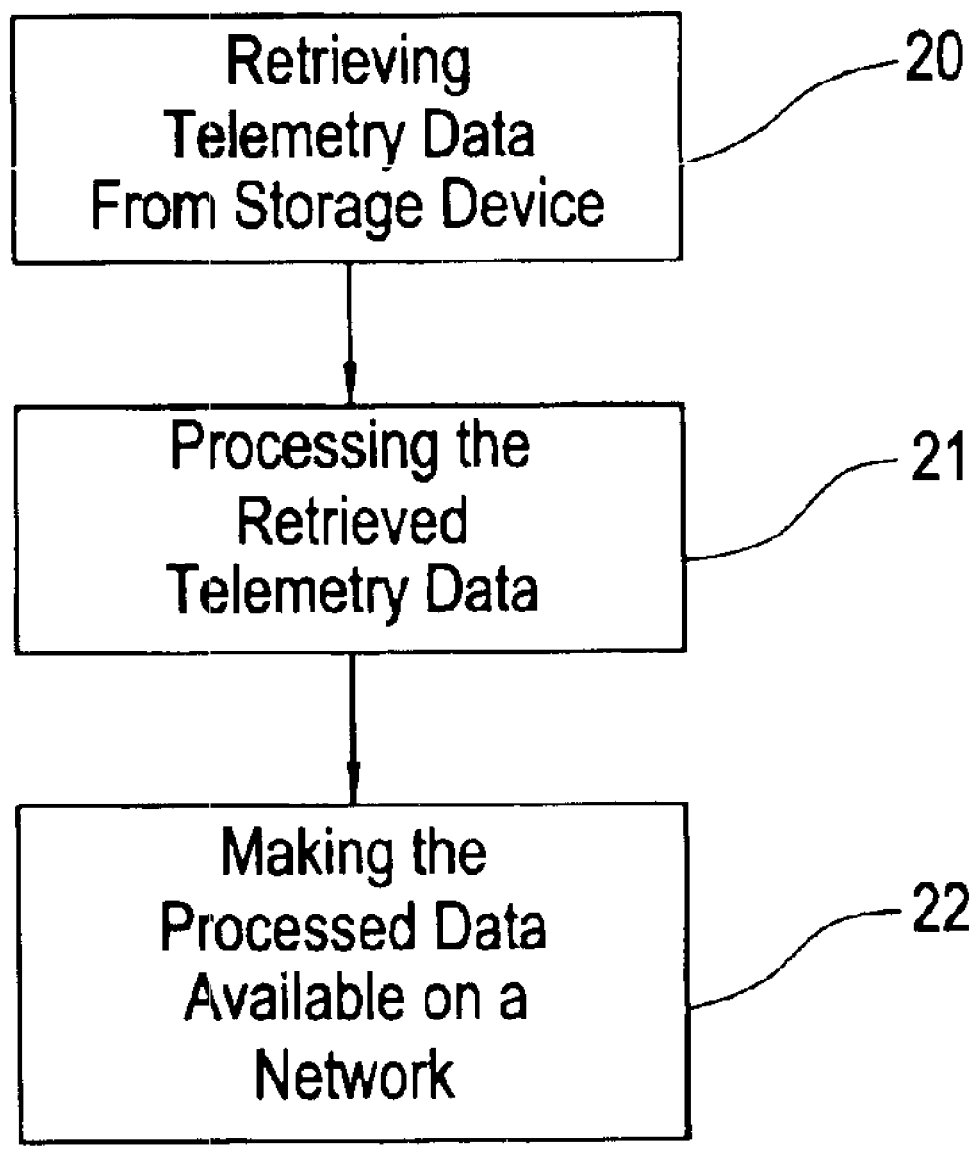
FIG. 3 is a flow diagram showing steps included in a first embodiment of the method of the present invention for monitoring spacecraft performance.

The method of the present invention may be implemented by the system shown in FIG. 2. Referring to FIG. 3, a preferred embodiment of the method of the present invention for monitoring the operation of a spacecraft includes as an initial step retrieving telemetry data from the storage device. (Block 20). The telemetry data may be any type of data relating to the operation or performance spacecraft which has been previously transmitted from the satellite for receipt by the storage device.

A second step includes processing the telemetry data retrieved from the storage device. (Block 21). The processing of this data may involve one or more mathematical operations, or may simply involve preparing or organizing the data in a visually desirable form for display. Preferably, the data is processed in a form suitable for use by the end user, who may be a customer of the satellite service provider, a technician, or other person. In accordance with one particularly advantageous feature of the invention, the form in which the data is processed and presented may be controlled by the end-user.

A third step of the method includes making the processed telemetry data accessible on the network. (Block 22). This may be accomplished in a variety of ways. For example, the data may be made accessible in response to a request received from the end user. The request may be sent by telephone or electronically such as via e-mail. If the network is the internet, the data is preferably made accessible on a website which, for example, may be provided by the satellite service provider. Under these conditions, the request would be made as a result of the user interacting with the website. The ability to allow an end-user to request telemetry data electronically is an especially advantageous features of the invention, because under these conditions any one or more of the retrieving, processing, and making steps of the invention may be automatically performed.

Figure 4:
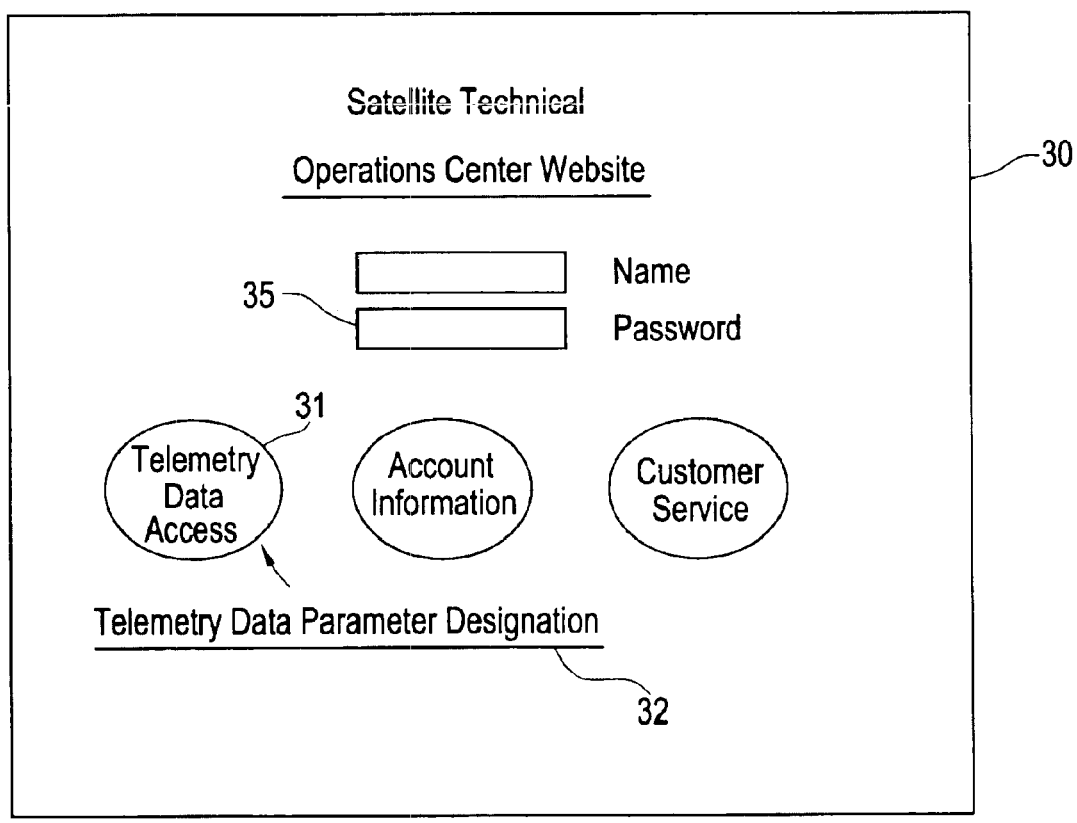
FIG. 4 is a diagram of an exemplary website page generated in accordance with the present invention.

FIG. 4 shows an example of a web page 30 generated in accordance with the present invention. The web page may include a selectable icon 31 which an end user may click on to access telemetry data which has been historically archived in the storage device, e.g., the HEART system. Alternatively, or in addition, the web page may include a hyperlink 32 which an end user may select to enter in one or more parameters of interest for the satellite that may be derived from the archived telemetry data. For example, an end user may specify a desire to obtain helix current data for the satellite transponder over a certain period of time, e.g., the last 72 hours. The period of time may be changed by the user as well as the number of parameters to be retrieved from the system. If desired, default settings may be used as a guide for retrieving data from the storage device.

Figure 5:
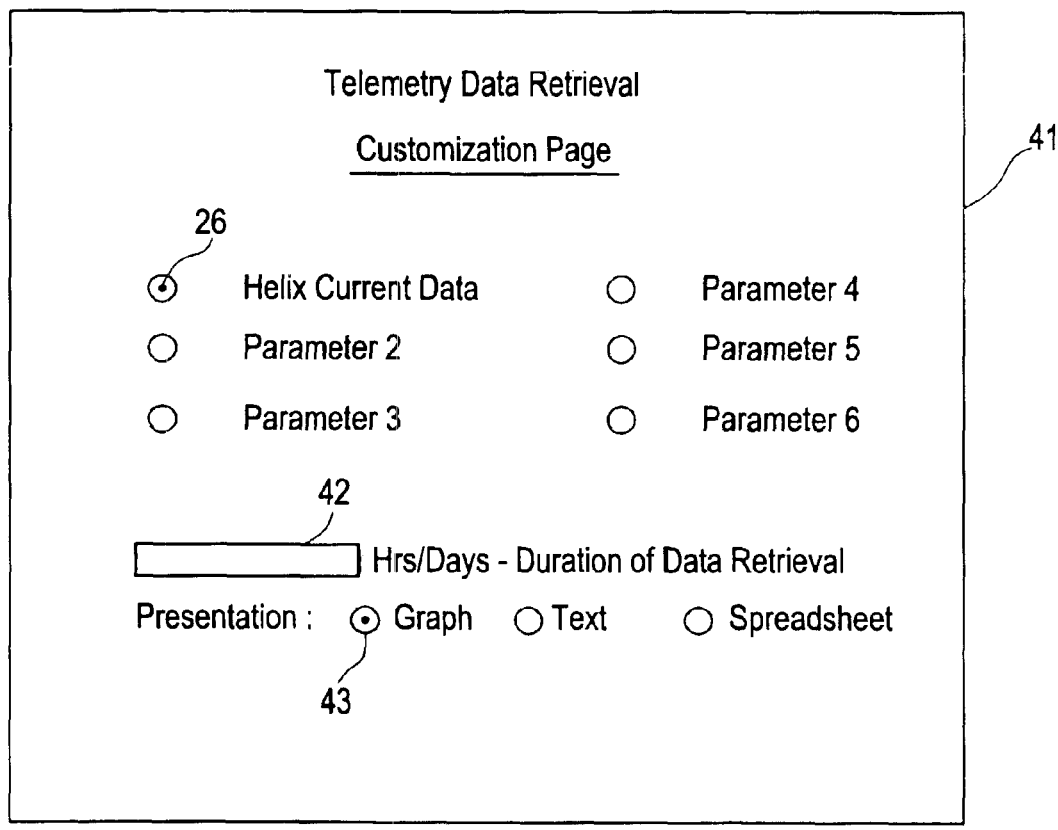
FIG. 5 is a diagram of another exemplary website page generated in accordance with the present invention.

FIG. 5 shows an example of a web page 40 that may be generated when the telemetry data parameter designation hyperlink is selected. This page includes a plurality of data entry windows which may be selected by an end-user to customize data retrieval and output. These windows include a window 41 which designates the type of telemetry data to be retrieved, a window 42 which indicates how much data should be retrieved (e.g., all helix current data points over the last 72 hours), and windows 43 which give the end-user a choice of how that data should be presented (e.g., a graph form, as a spreadsheet, etc.). Those skilled in the art can appreciate that drop-down menus with predetermined selection options may be used for data entry for one or more of the windows discussed above.

One optional feature of the invention is to employ security measures to protect access data from the web page. These security measures maybe, for example, the use of a public key infrastructure key and certificate or the entry of a valid user name and password, the latter of which is shown in FIG. 4 by window 35.

The ability to access satellite telemetry data upon request from a network is an especially advantageous feature of the invention. Conventionally, in order to obtain this data an end-user (e.g,. customer of a satellite services provider) had to place a telephone call to a technical operations center to request the data. A technician at the center would then have to manually retrieve the information and then organize, compile, or otherwise process the information so that it could be placed in a meaningful form for the customer. This mostly manual process has proven to be inefficient, both to the satellite service provider in terms of overhead (e.g., hardware, additional employees, etc.) and the customer in terms of delays in receiving a response from the provider, which delays could amount to hours or even days.

Unlike conventional methods, the present invention makes this data accessible to a user along a network, either at the user's request or as a result of a periodic posting of this information, for example, on a provider's website. Through this network access, the invention provides an immediate response to customer requests for telemetry data. This results in enhanced efficiency to the customer. The efficiency of the satellite service provider's and its cost of doing business is also optimized because, according to at least one aspect of the invention, the process is completely automated, i.e., occurs without any manual input whatsoever by the satellite service provider.

Providing telemetry data through an network offers at least one additional advantage. In accordance with a business method embodiment of the invention, software used to manage the satellite service provider's network site may automatically create an accounting record in response to an end-user's request for telemetry data. The accounting record may include a cost of downloading the telemetry data to the end-user as well as for other services. This accounting record may then be used as a basis for billing the end-user or, for example, charging an end-user's account.

One variation of the method of the present invention may include retrieving, processing, and making telemetry data accessible through a network on a periodic basis. This may be accomplished as a result of pre-programmed instructions into the software used to manage the satellite service provider's website. For example, the provider may have an agreement with the end-user, or the end-user may designate, that a certain type of telemetry data will be automatically generated and made accessible at the service provider's website every month for quality review purposes. Under this scenario, the end-user could access his account on the website to access the information without ever having to request it. If desired, the website may send the end-user an e-mail indicating that the data has been posted. Alternatively, the telemetry data may be automatically sent to the user as an e-mail attachment.

Figure 6:
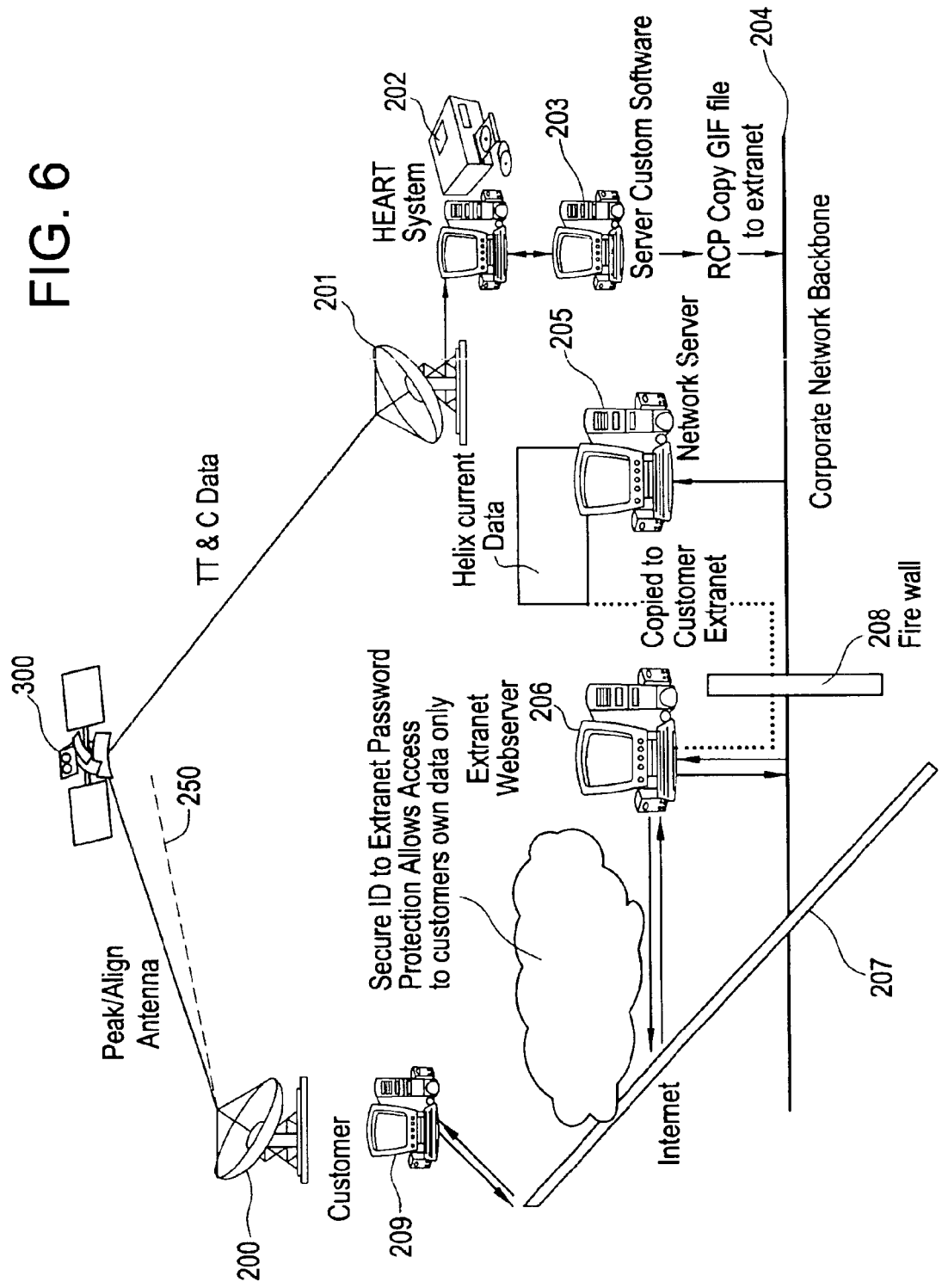
FIG. 6 is a diagram of a second embodiment of the system of the present invention for monitoring spacecraft operation.

Referring to FIG. 6, a second embodiment of the system of the present invention stores helix current data from a satellite transponder and then makes that data accessible on a network. The system includes a transmitting antenna 200 at the customer site, a receiving antenna 201, a HEART data storage and retrieval system 202, a server 203, an extranet 204, a server 205, an extranet webserver 206, and a network 207. The transmitting antenna transmits information to the receiving antenna through a communications satellite 300. The information may be telephone calls, media information, satellite photos, or any other type of data that needs to be communicated from one point on the earth to another.

The HEART system stores one or more forms of data which are telemetered to the receiving antenna from the satellite. During transmission, anomalies may arise which degrade the quality of communications. One satellite parameter which may provide an indication of this degradation, and a clue as to how the anomalies may be solved, is helix current data. This data has therefore been found to be particularly useful to the customers of satellite service providers, not only for its anomaly detection properties but also because it is useful in detecting the presence of unauthorized signals on a customer's satellite transponder. The HEART system stores at least this helix current data on a periodic basis.

Figure 7:
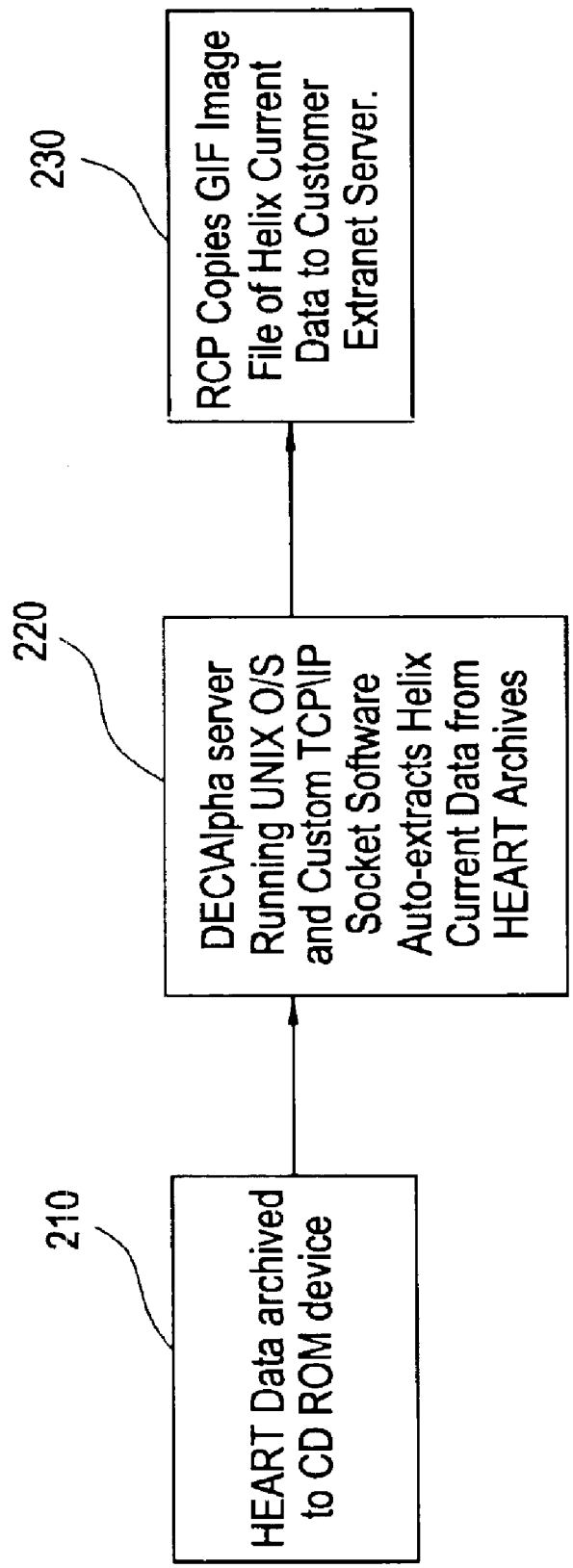
FIG. 7 is a flow diagram showing steps included in a second embodiment of the method of the present invention for monitoring spacecraft operation.

Server 203 is performs the function of automatically extracting the helix current data from the HEART system for storage on server 205. The server 203 is preferably a DEC/Alpha server running custom TCP/IP socket software and a UNIX O/S platform, although those skilled in the art can appreciate that other types of servers and operating systems may be used. The data extracted by the server may be automatically organized in a spreadsheet (e.g., Microsoft Excel) stored in server 205. Using a Remote CoPy (RCP) UNIX file copy command, a GIF (graphics interchange format) file corresponding to this data may optionally be stored in extranet webserver 206 maintained by the satellite service provider. This data may then be accessed by customers and/or employees via network 207, which may be the internet. The extranet server 205 may be connected to webserver 206 via a firewall 208. A process flow of these extraction and copying steps is shown in FIG. 7, where Block 210 relates to data archival in the HEART system, Block 220 relates to the automatic extraction of the data from HEART, and Block 230 relates to the copying of the extracted data into the extranet server.

A secure connection may be established between a customer terminal 209 and webserver 206 via the internet. The secure connection may be formed, for example, through any of a number of known password-protection schemes. These password-protection schemes are advantageous because they prevent unauthorized users from accessing the helix current data.

Figure 8:
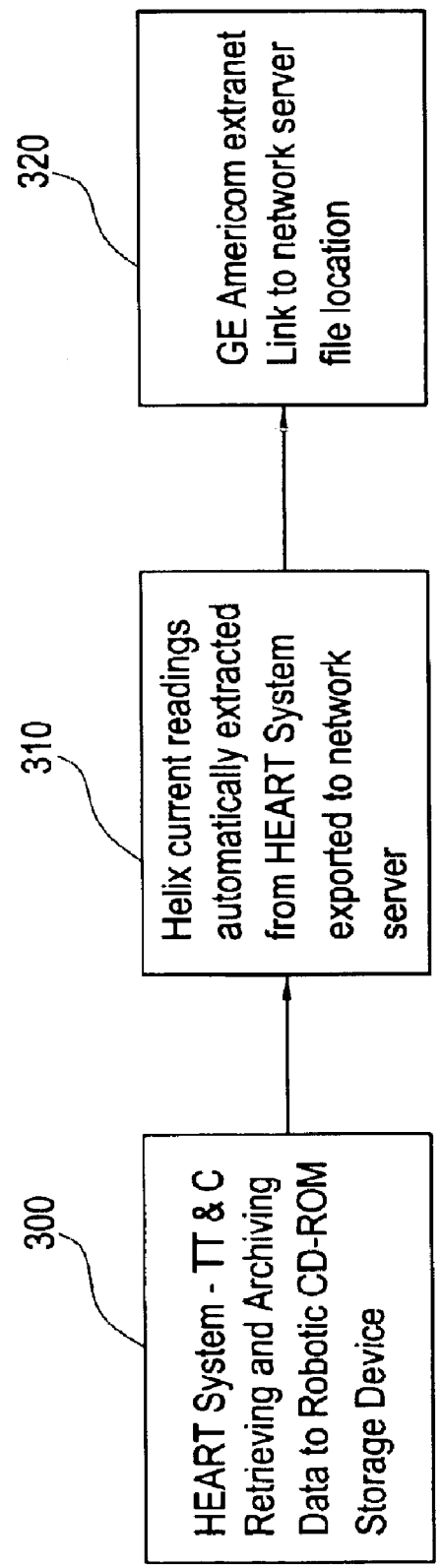
FIG. 8 is a flow diagram showing additional steps included in the second embodiment of the method of the present invention.
Figure 9:
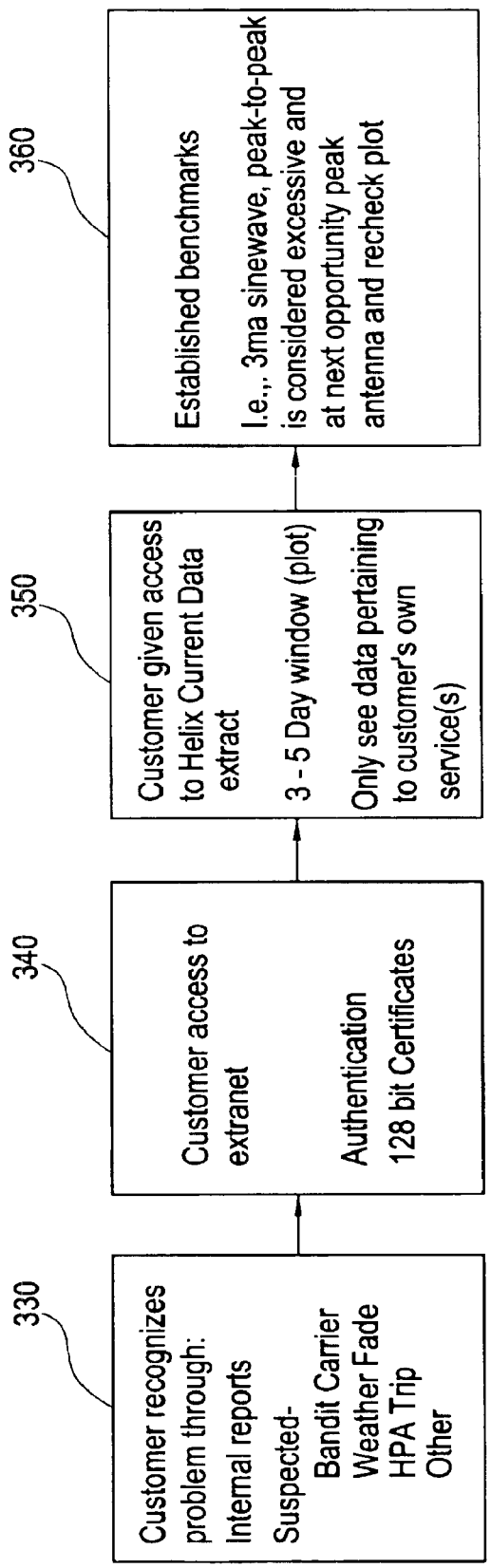
FIG. 9 is a flow diagram showing additional steps included in the second embodiment of the method of the present invention.

Referring to FIGS. 8 and 9, an embodiment of the method of the present invention implemented by the system shown in FIG. 6 includes as an initial step storing helix current telemetry data in the HEART storage and retrieval system. (Block 300). This may be performed using a Visual C++ program. In a second step, the helix current data is automatically extracted from the HEART system for storage in network server 205. (Block 310). In a third step, a link is established between websever 206 and server 205 to access the stored telemetry data. (Block 320). This step may be performed in response to a customer request for data, as a result of a periodic linking process, or at any other time.

In a fourth step, the customer recognizes that a problem relating to communication quality has occurred. (Block 330). The customer may then optionally obtain information within his own system to confirm the existence of the problem. Problem confirmation may occur, for example, when a number of the customer's downlink sites all report a similar problem. The customer then attempt to resolve the problem.

In a fifth step, the customer accesses a website of the satellite service provider which is maintained by webserver 206. (Block 340). Access may be controlled using a secure ID and password program such as provided by VeriSign's 128-bit Certificate. This program is preferable because it authenticates user access so access to a customer's own data integrity is verified at login. If login is successful, the customer may access the helix current data archived by the HEART system and now stored in one of servers 205 and 206. The ID and password information entered by the customer allows the customer to access his own telemetry data within the satellite system. As will be explained in greater detail below, additional information may be entered after access is gained to facilitate retrieval of specific telemetry data for the customer.

In a sixth step, a processor located at either server 205 or 206 processes the helix current data. (Block 350). The processing may be performed automatically as a result of the customer logging in or in response to a specific request for the data. Processing may be performed in accordance with any of the forms previously described. For example, the processing may be a standard type of processing performed for all helix current data, which may involve generating a graph over a predetermined period of time. The period of time may be varied, with 72 hours being preferable. If desired, the graph may include a helix data plot for each of a plurality of satellite transponders which correspond to the customer's services.

Figure 10:
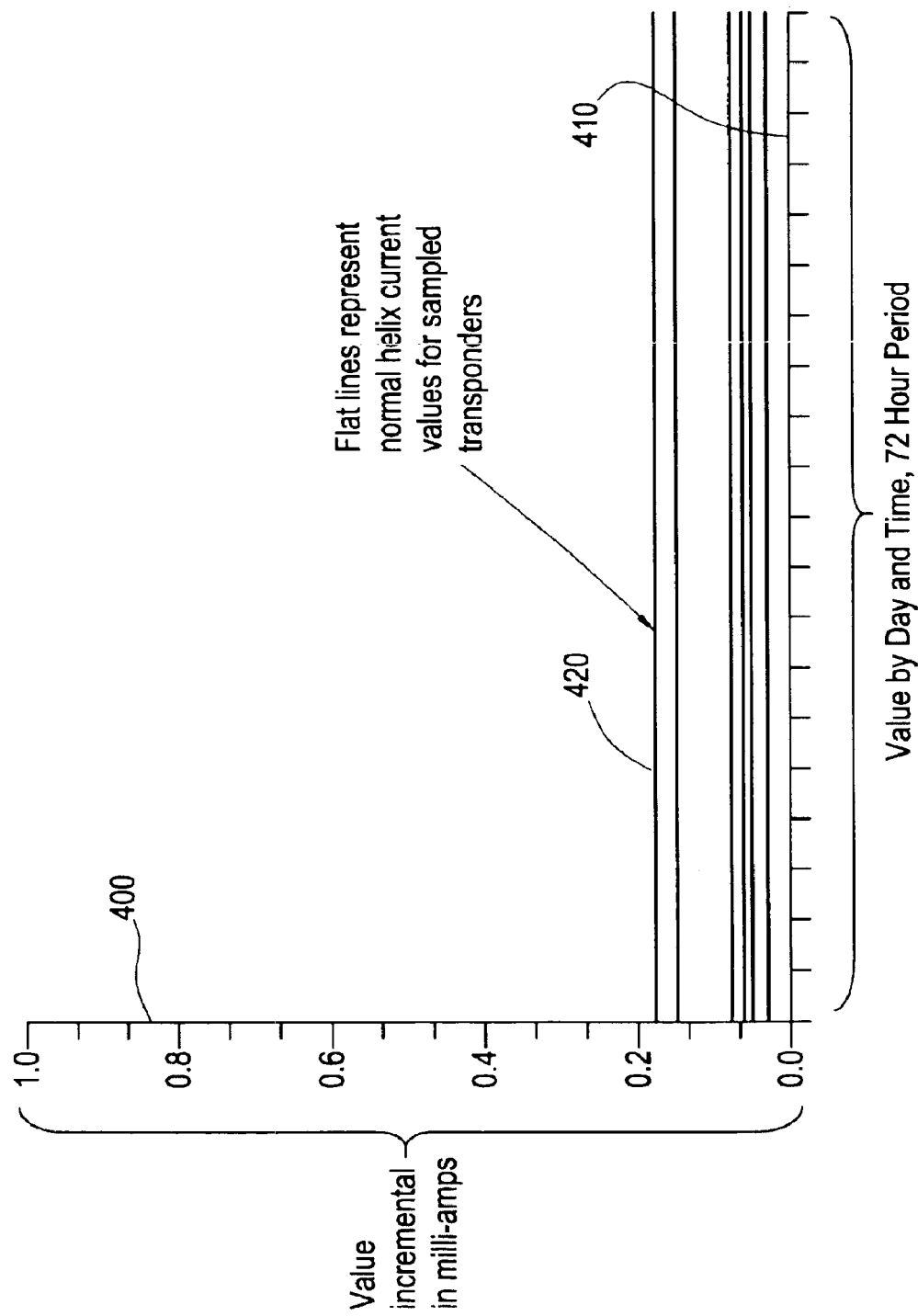
FIG. 10 is a diagram of a graph plotting normal helix current data over a predetermined period of time, which graph is generated in accordance with second embodiments of the system and method of the present invention.

FIG. 10 shows an exemplary graph generated in accordance with the present invention. In this graph, incremental values of helix current data expressed in milli-amps is shown along a vertical axis 400, and time is shown along the horizontal axis 410. The time axis is divided into increments within a 72-hour period. In this graph, multiple curves are plotted to show the status of the helix current data for a particular customer's satellite transponders over the previous 72 hours. In this example, all the curves are flat lines 420, which represent values which occur during normal (non-anomalous) operating conditions. Specific statistical data 530 relating to satellite operating conditions may be shown in this graph.

Figure 11:
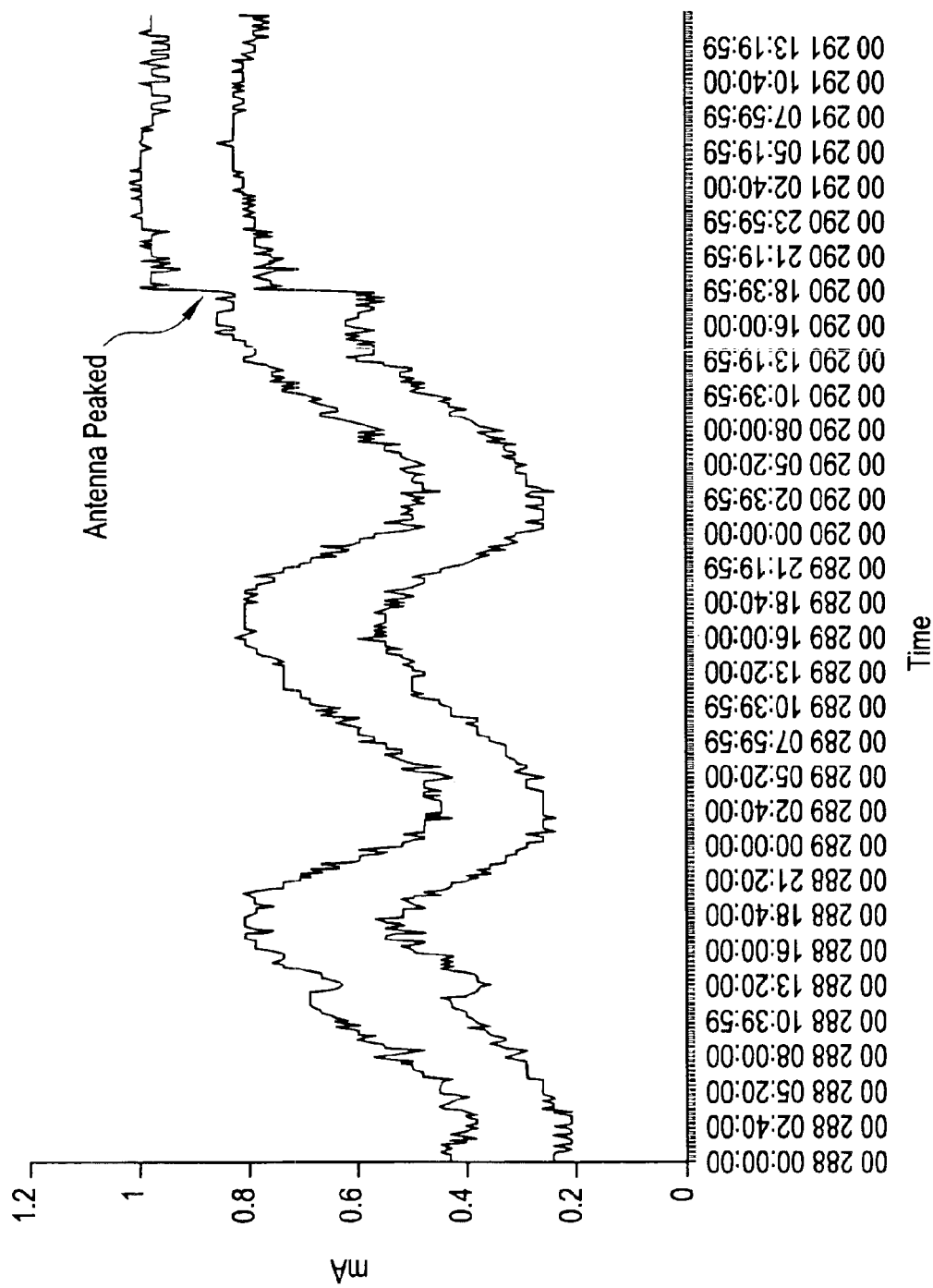
FIG. 11 is a diagram of a graph plotting abnormal helix current data over a predetermined period of time, which graph is generated in accordance with second embodiments of the system and method of the present invention.

FIG. 11 shows an exploded view of a graph that may be generated when an anomalous condition occurs during satellite operation. In this graph, which have the same vertical and horizontal axes, curves 500 and 510 are substantially sinusoidal in nature, which suggests that an anomaly occurred over the time period shown. In this specific example, curves 500 and 510 were generated as a result of an antenna pointing error, as shown by reference numeral 250 in FIG. 6. The point at which the pointing error was resolved (i.e., where the antenna was correctly aligned with the satellite or "peaked") is shown by reference numeral 520. After this point, the curves begin to flatten out to resemble normal operating conditions. In practice, benchmarks and established standards may dictate acceptable thresholds at which a customer may assume a problem has occurred. (See Block 360 in FIG. 9). For example, if a customer sees greater than 0.3 ma sinewave peak-to-peak, this may be considered excessive and at the next opportunity the peak of the antenna may be corrected.

If desired, the processing of the helix current data may be controlled by the customer entering various types of control parameters, for example, as shown in FIGS. 4 and 5. Alternatively, the helix current data may be automatically processed in advance, for example, on a periodic basis and presented to the customer either via e-mail or upon login at the website.

In a seventh step, the processed helix current data is transmitted from the webserver 206 to the customer terminal through the internet. The customer may then use this data to confirm that an anomaly has occurred and then take corrective action based on his interpretation of the helix current data. From the foregoing steps, it is clear that, through the invention, the customer is able to acquire this data in a manner which is completely transparent to the technical operations center of the satellite service provider. Thus, all the steps that were manually performed by satellite service provider representatives are automatically performed by the invention, which results in significant cost savings and efficiency enhancements to both the service provider and the customer.

Figure 12:
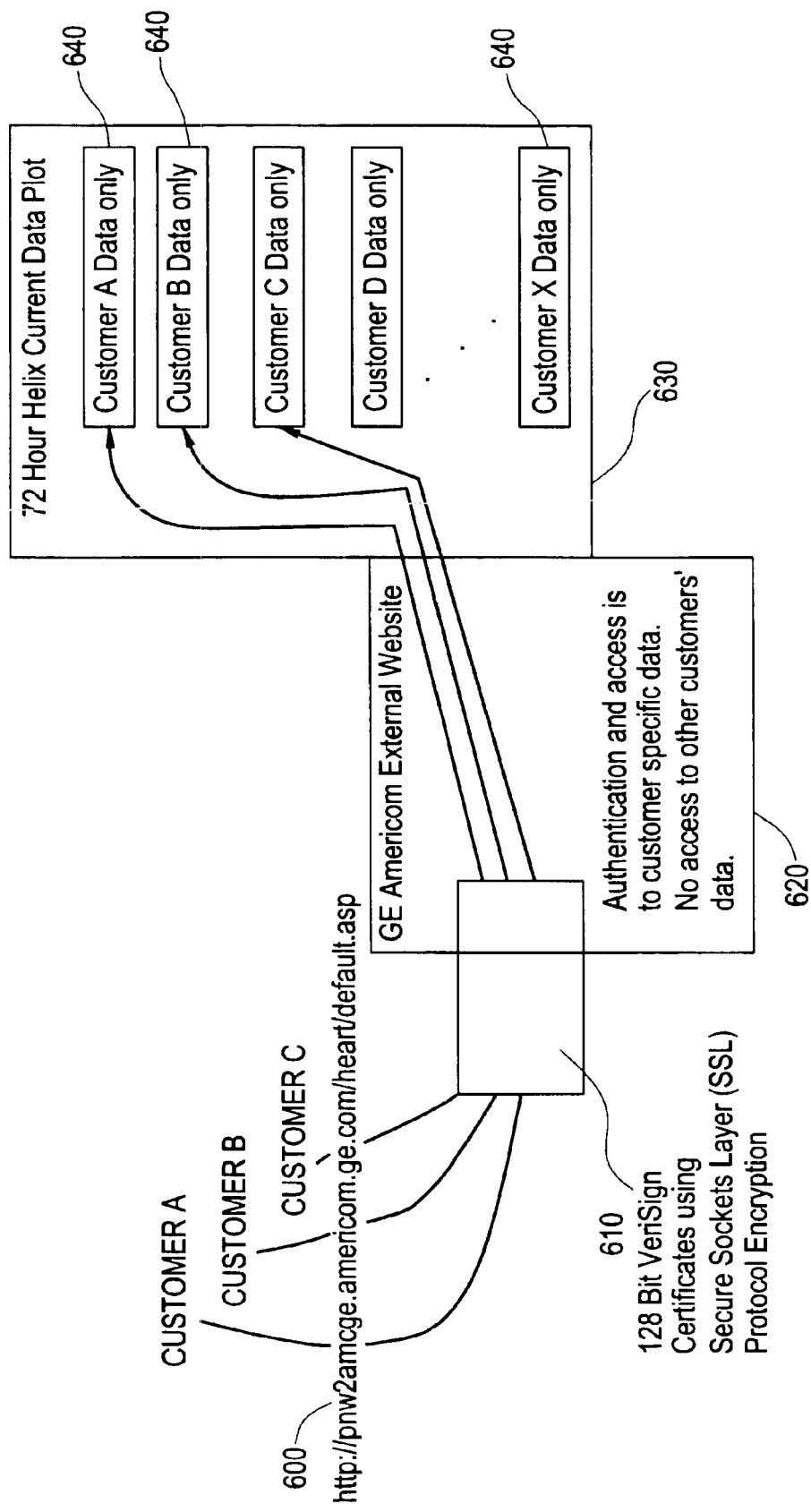
FIG. 12 is a diagram showing how multiple customers may access telemetry data processed in accordance with the system and method of the present invention.

For ubiquitous appeal, the system of the present invention may be configured to store telemetry data for a plurality of customers in separate files. FIG. 12 shows a process flow in this regard. In the example shown, the satellite service provider has three customers, namely Customer A, Customer B, and Customer C. Each customer may log on to the provider's website using URL 600. As previously explained, log on may be accomplished, for example, through 128-bit VeriSign Certificates 610 using Secure Sockets Layer (SSL) Protocol Encryption. Once access is gained into the webserver 620, the customers may access their respective helix current data plots 630 over, for example, the previous three days. To ensure that each customer only receives his own data, the plots may be maintained in separately located files within the network server 640.

Another embodiment of the system and method of the present invention is similar to previous embodiments, except that the satellite service provider makes real-time telemetry data accessible to customers on a website. This may be accomplished, for example, by immediately outputting raw telemetry data from the HEART storage device to the server, or if desired by bypassing the HEART system altogether to make this raw data server accessible. The data may also be provided in near real-time. In these circumstances, the data may be processed for example in any of the previously mentioned ways before being made server accessible. Providing real- and near real-time access to telemetry data is an especially advantageous features of the invention because it will enable customers to respond even more quickly than previous embodiments to possible failures that occur during satellite transmissions.

Other modifications and variations to the invention will be apparent to those skilled in the art from the foregoing disclosure. Thus, while only certain embodiments of the invention have been specifically described herein, it will be apparent that numerous modifications may be made thereto without departing from the spirit and scope of the invention.

What is claimed is:

1. A method for monitoring operation of a spacecraft, providing communications services comprising:

retrieving telemetry data indicative of a malfunction of the spacecraft from a storage device;

processing the telemetry data; and making the processed telemetry data accessible on a network, wherein at least said processing and making steps are automatically performed in response to a request for the telemetry data received from a communications services customer or technician and wherein said request is received through the network, said method further comprising:

automatically creating an accounting record in response to said request for telemetry data, said accounting record indicating a cost of downloading the processed telemetry data indicative of the malfunction of the spacecraft to the customer or technician from said internet website.

2. The method of claim 1, wherein said making step includes: making the processed telemetry data accessible on an internet website.

3. The method of claim 2, wherein said internet website is a secure website.

4. The method of claim 3, wherein said website is secured by password-protection, and wherein said method further comprises downloading the processed telemetry data to said customer or technician only after said customer or technician enters a valid password.

5. The method of claim 1, wherein said retrieving, processing, and making steps are automatically performed on a periodic basis.

6. The method of claim 5, further comprising:

automatically sending the processed telemetry data to the customer or technician through said network.

7. A method for monitoring operation of a spacecraft, comprising:

automatically retrieving telemetry data based on a customer request;

processing the telemetry data; and making the processed telemetry data accessible to the customer on a network, wherein said telemetry data includes helix current data for said spacecraft, wherein said processing step includes;

automatically generating a graph of said helix current data over a predetermined period of time in response to logon by the customer on a network site, said graph being generated to show an anomalous condition of the spacecraft as a sinusoidal waveform having peak-to-peak values which exceed a predetermined range.

8. A system for monitoring operation of a spacecraft, providing communications services comprising:

a storage device for storing telemetry data indicative of a malfunction of the spacecraft;

a processor for processing the telemetry data; and a communications module which makes the processed telemetry data accessible on a network, wherein said processor controls the communications module to automatically send the processed telemetry data through communications services the network in response to an electronic request for the telemetry data, wherein the electronic request is formulated through customer activation of a hyperlink on a network website, and wherein said processor automatically creates an accounting record in response to the request for the telemetry data, said accounting record indicating a cost of sending the processed telemetry data indicative of the malfunction of the spacecraft through the network.

9. The system of claim 8, wherein said processor automatically processes the telemetry data on a periodic basis.

10. The system of claim 9, wherein said processor controls the communications module to automatically send the processed telemetry data through the network on said periodic basis.

11. A method for providing an interactive website which relates to spacecraft operation, providing communications services comprising:

displaying (a) a first selectable icon relating to formulation of a request for telemetry data (b) second selectable icon relating to access of customer account information, and (c) a third selectable icon relating to providing communications services customer service, and displaying a list of selectable parameters on said website when the first icon is selected which provides an indication of data relating to spacecraft operation;

receiving a request from a user indicating one or more parameters selected from the list;

retrieving data corresponding to the selected parameters from a storage device in response to said request; and processing said data retrieved in said retrieving step.

12. The method of claim 11, wherein said request is made by a user selecting said hyperlink.

13. The method of claim 11, wherein the parameters on the list are displayed as selectable icons.

14. The method of claim 13, wherein said request is made by a user selecting one or more of said icons.

15. The method of claim 11, further comprising:

displaying icons which designate how the processed data is presented to a customer.

16. The method of claim 15, wherein the icons which designate how data is presented to a customer designate presenting the processed data in graph form, presenting the processed data in text form, and presenting the processed data in spreadsheet form.

17. A system for monitoring operation of a spacecraft, providing communications services comprising:

a storage device for storing telemetry data;

a processor for automatically processing the telemetry data in response to detection of a customer logon onto a network site; and a communications module which makes the processed telemetry data accessible on the network site, wherein the network site is password protected, wherein the processor automatically creates an accounting record in response to a request for the telemetry data indicative of a malfunction of the spacecraft, said accounting record indicating a cost of downloading the processed telemetry data indicative of the malfunction of the spacecraft to the communications services customer or technician from said internet website.

* * * * *

UNITED STATES PATENT AND TRADEMARK OFFICE
CERTIFICATE OF CORRECTION

PATENT NO. : 6,915,238 B2
DATED : July 5, 2005
INVENTOR(S) : Jeffrey Thomas Watts et al.

It is certified that error appears in the above-identified patent and that said Letters Patent is hereby corrected as shown below:

Column 10,
Line 13, delete "said" and insert -- an --.
Line 17, delete "an" and insert -- the --.

Column 11,
Line 9, after "(b)" insert -- a --.

Signed and Sealed this

Tenth Day of January, 2006

JON W. DUDAS
*Director of the United States Patent and Trademark Office*